Nov. 10, 1931.  L. F. KENNEDY  1,831,568
PROTECTIVE ARRANGEMENT
Filed Dec. 26, 1929
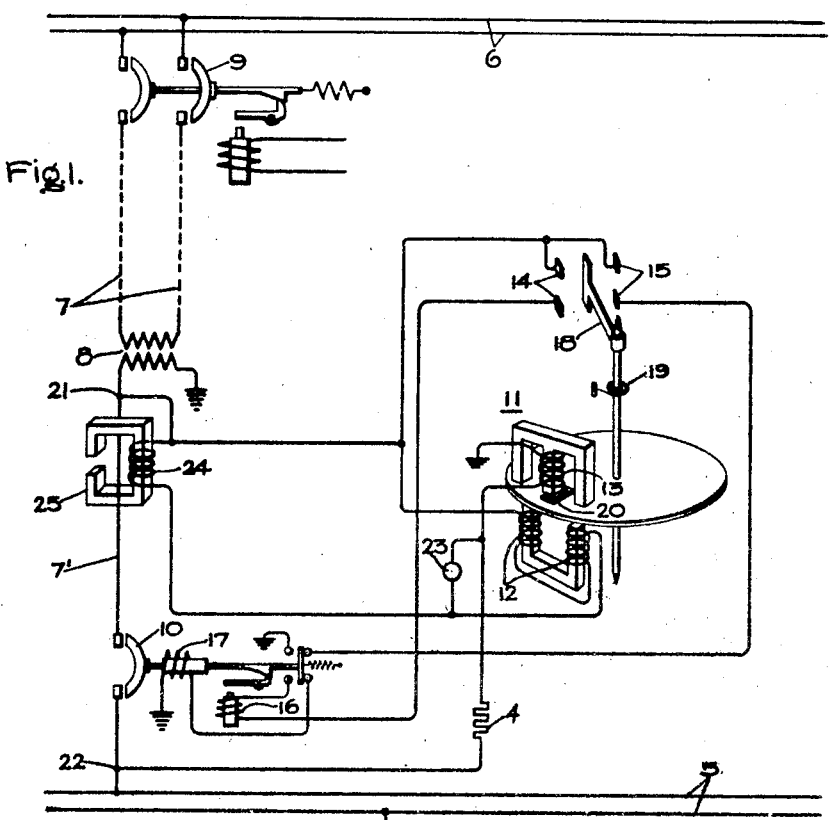
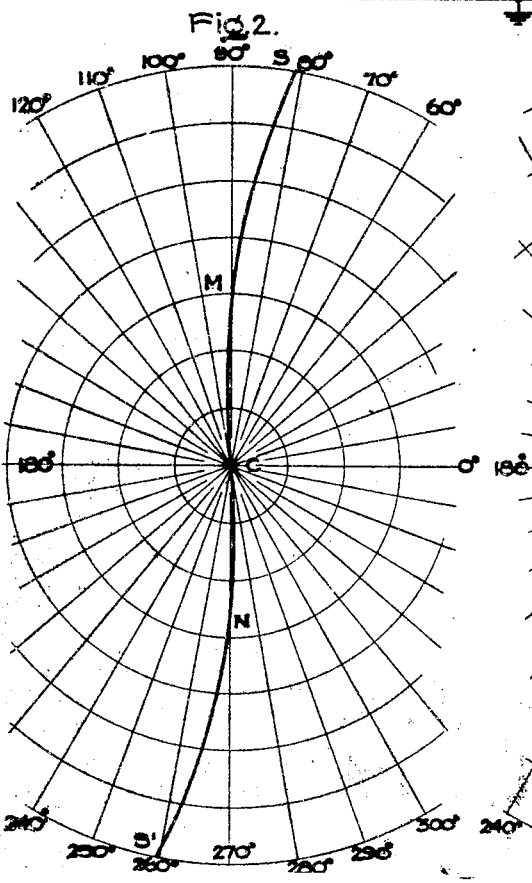
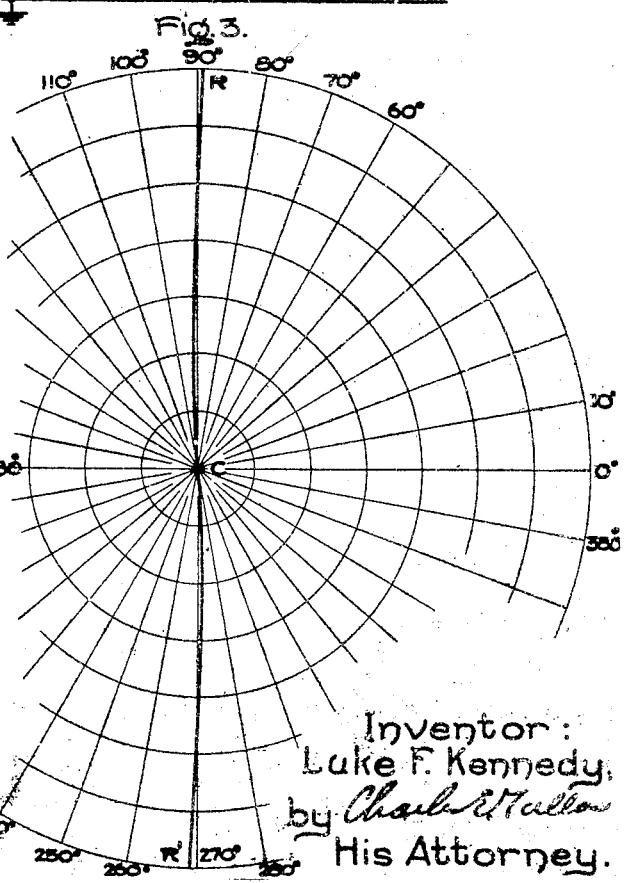
Inventor:
Luke F. Kennedy,
by Charles R. Mallon
His Attorney.

Patented Nov. 10, 1931

1,831,568

UNITED STATES PATENT OFFICE

LUKE F. KENNEDY, OF PHILADELPHIA, PENNSYLVANIA, ASSIGNOR TO GENERAL ELECTRIC COMPANY, A CORPORATION OF NEW YORK

PROTECTIVE ARRANGEMENT

Application filed December 26, 1929. Serial No. 416,451.

My invention relates to improvements in protective arrangements for alternating current electric circuits and more particularly for controlling electric circuits responsively to the direction of power and an object of my invention is to provide an improved protective arrangement whereby economically to insure the desired sensitivity for power in one direction and yet obtain a correct response when relatively large reactive currents occur.

My invention will be better understood from the following description when considered in connection with the accompanying drawings and its scope will be pointed out in the appended claims.

In the accompanying drawings, Fig. 1 diagrammatically illustrates, in single-phase for clearness, an embodiment of my invention in an alternating current low voltage distribution system, and Figs. 2 and 3 are charts explanatory of my invention.

For the purpose of illustrating my invention, I have shown in Fig. 1, a low voltage alternating current distribution system in which one or more relatively high voltage sources are connected through feeders and step down voltage transformers to a low voltage distribution network 5. For the sake of simplicity, I have shown but one source such as a station bus 6 and one feeder 7, 7' with one step down transformer 8, 7 being the high voltage side of the feeder which is shown in dotted lines to give a concept of distance and 7' being the low voltage side of the feeder. Although only one transformer 8 is shown, it is to be understood that each feeder 7 may supply several transformers 8 each having its own circuit breaker 10 and controlling means therefor. Each feeder is connected to the source on the high voltage side by suitable circuit controlling means such as a circuit breaker 9 which may be controlled in any suitable manner either manually or in response to abnormal circuit conditions or both, as is well known to the art. On the low voltage side 7', each transformer 8 is connected to the network through suitable circuit controlling means such as a latched closed circuit breaker 10.

For controlling this circuit breaker, there is provided means responsive to the direction of power between the source 6 and the network 5. This means is illustrated as a power directional relay 11 of the induction disk type having cooperating current and potential windings 12 and 13 respectively. This relay controls the tripping and closing contacts 14 and 15 respectively in the circuits of the tripping and closing coils 16 and 17 respectively of the feeder circuit breaker 10. As shown, these coils are connected to be energized from the low voltage portion 7' of the feeder on the station side of the circuit breaker 10. The movable element 18 of the relay is biased by suitable means such as a spring 19 which tends to hold the closing contacts 15 closed. In order to prevent the closing of the contacts 15 by the spring 19 when the network 5 is energized but the current winding 12 is deenergized, the magnetic element of the potential winding 13 is provided with a shading winding 20 so positioned that the voltage magnetic element alone tends to exert a torque in a direction to maintain the movable element 18 in the neutral position illustrated.

The arrangement is such that when the voltage of the network 5 is less than the voltage of the feeder 7' and has the proper phase relation relatively thereto, relay 11 completes the circuit of the closing coil 17 and thereby effects the connection of the feeder 7, 7' to the network 5, the circuit breaker 9 being assumed to be closed. In other words, when power will flow from the bus 6 to the network 5, the torque exerted by the current and potential windings 12 and 13 is in a direction to effect the closing of the contacts 15. For this purpose, the current winding 12 is connected across the circuit breaker 10 between the points 21 and 22 as shown. The circuit of the current winding 12 includes suitable current limiting means such as a ballistic resistor 23 the functions of which are to limit the current in the feeder when the circuit breakers 9 and 10 are open and also to protect the winding against excessive voltages in case the proper phase relation does not exist between the voltage of the network 5 and the voltage of the feeder 7' when the circuit breaker 9 is closed and the circuit breaker 10 is open. The potential winding 13 is connected to be energized in accordance with the voltage of the network from the point 22 to ground as shown.

When the circuit breaker 10 is closed, the voltage difference between the points 21 and 22 is substantially zero but the current winding 12 is now energized in accordance with the current flowing from the low voltage side 7' of the feeder by suitable means such as a current transformer 24. So long as power is in the direction from the bus 6 to the network 5, the torque of the relay 7 is in a direction to close the contacts 15. When, however, the voltage of the network 5 is higher than that of the feeder, as for example when the circuit breaker 9 is open or there is a fault on the feeder, the direction of power is from the network to the feeder. In this case, the torque exerted by the cooperating current and potential windings 12 and 13 is in a direction to effect the closing of the tripping contacts 14. If the station circuit breaker 9 is open and there is no fault on the feeder, the relay 11 has to operate on a relatively small power reversal since the only load may be the exciting current of the power transformer 8.

Inasmuch as the relay 11 must operate to effect the closing of the feeder circuit breaker 10 when the voltage of the feeder exceeds the voltage of the network by a small amount, the current winding 12 which, under the closing conditions, is a phasing winding, requires a relatively large number of turns in comparison with the current coil of the usual power directional relay. If the relay is to effect the tripping of the feeder circuit breaker 10 on the small reverse exciting current of the transformer 8, the relatively large number of turns in the current winding 12 also insures a stronger torque in the tripping direction. The secondary burden imposed on the current transformer 24 by reason of the relatively high impedance of the current winding 12 is, therefore, large and apt to cause saturation of the ordinary current transformer, even at relatively small currents.

One effect of this saturation is to shift the phase of the fundamental of the secondary current. Consequently there is a shift in the phase angle between the primary and secondary currents. The result of this shift on the relay operation is shown by the combination current transformer and relay characteristic drawn in the heavy line SCS' of Fig. 2. Also by reason of saturation, there is a change in the ratio of transformation of the current transformer. This change tends to shift the characteristic to a position parallel to itself. This is apparent from the lack of symmetry of the two parts CS, CS' of the characteristic SCS'. In Figs. 2 and 3 which are polar diagrams, the horizontal line C—0° indicates the direction of the voltage on the potential winding 13, that is the voltage of the network 5. The light radial lines indicate the numerous possible directions of the current in the feeder 7' relatively to the voltage C—0°. The light concentric circles by the lengths of their radii indicate the magnitude of the current. For currents anywhere to the left of the heavy line SCS', the relay 11 functions to trip the circuit breaker 10 and to the right does not trip it.

It frequently happens that the high voltage portion 7 of the feeder is not only underground, that is, cable type, but also is often of great length. It is, therefore, subject to more or less reactive current which is a charging current that varies over a wide range, from zero when both circuit breakers 9 and 10 are open to a relatively high value when either circuit breaker is closed, depending on the length of the feeder. The amount of charging current to be fed from the network 5 through any one of the circuit breakers 10 depends of course on how many of the feeder network circuit breakers on a given feeder are closed. The reverse exciting current of the transformer 8, when the circuit breaker 9 is open and the circuit breaker 10 is closed, is comparatively small and relatively to the voltage C—0° of the network lies in the second quadrant between 90° and 180° and close to the 90° line. The charging current of the feeder will fall in the third quadrant between 180° and 270°. If the magnitude of the resultant of the reverse magnetizing current of the transformer 8 and the charging current of the feeder is such that the outer end of its vector falls to the right of the portion CS' of the characteristic SCS' or within the area bounded by S'—N—270°, the circuit breaker 10 will not be opened as it should be. Similarly, if the outer end of the vector representing the feeder current falls within the area bounded by S—M—90°, the relay 11 will close its tripping contacts when it should not and the circuit breaker 10 will be opened when it should remain closed. This latter condition may occur when the station circuit breaker in some other feeder is open if there is a light load on the network. In this case the feeder in service is supplying charging current to the other feeder in the normal direction of power. This leading current would fall in the first quadrant between 0° and 90° while the transformer exciting current would be in the fourth quadrant between 270° and 0°. Thus, if the circuit breakers 9 and 10 in the feeder 7, 7' were closed and the station circuit breaker in another feeder were open, the relay on the feeder 7, 7' might operate to trip the feeder circuit breaker 10 and the relay in the other feeder with its station circuit breaker open would fail to trip. This is just the reverse of the action desired on each of the feeders. The desired characteristic of the relay is, of course, the straight line 90°—C—270°.

In order to avoid the undesirable relay characteristic SCS' of Fig. 2, I so arrange, in accordance with my invention, that the current transformer 24 has substantially uniform permeability for all values of current within the range of the leading reactive current to which the circuit controlled by the relay 11 may be subjected. One way in which this can economically be done is to provide the current transformer with a magnetic circuit or core 25 having such a high reluctance as to prevent saturation under the values of charging current to be expected in practice.

I may introduce an air gap in the transformer core 25 as shown to obtain a more uniform permeability. This results in a smaller shift in the characteristic of the transformer and relay combination as shown by the symmetry of the two portions CR and CR' of the curve RCR' of Fig. 3. The more uniform permeability also results in a smaller and more gradual phase angle change as saturation is approached.

The greater reluctance of the magnetic circuit introduces an initial phase angle due to the increased amount of exciting current required. This initial phase angle can be compensated by adjustment of the phase angle of the current in the potential winding 13 using suitable means such as a resistance 4. Since there is a definite maximum limit to the phase angle between the primary and secondary currents, the introduction of a relatively large initial phase angle reduces the range of phase angle variation which might occur with saturation. This is shown by the relative straightness of the characteristic RCR' of Fig. 3 as compared with SCS' of Fig. 2.

Under these conditions, the operation of the relay 11 which is dependent on the product of the fluxes established by the windings 12 and 13 is such as to insure the desired control of the circuit breaker 10 in accordance with the characteristic shown by the heavy line RCR' of Fig. 3, which represents the type of characteristic to be obtained with protective arrangements embodying my invention. From this characteristic, which is substantially identical with the straight line 90°—C—270°, it will be observed that the desired circuit controlling action can be obtained for whatever amount of leading reactive current is expected in the feeder in practice.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination, an alternating current electric circuit and circuit controlling means therefor including a circuit breaker and means for controlling the operation of said circuit breaker including a power relay having cooperating current and potential windings for effecting the opening of the circuit breaker when power in the circuit is in a predetermined direction and means for energizing the current winding of said relay in accordance with the current of said circuit including a current transformer having cooperating primary and secondary windings and a high reluctance magnetic circuit whereby to obtain a substantially constant phase relation between the primary and secondary currents of the current transformer.

2. In combination, an alternating current electric circuit, circuit controlling means therefor including a circuit breaker, means for controlling the operation of said circuit breaker including a power relay for effecting the circuit controlling operation of the circuit breaker when power in the circuit is in a predetermined direction, said relay having cooperating current and potential windings and means for energizing the current winding in accordance with the circuit current including a current transformer having a magnetic core with an air gap.

3. In combination, an alternating current electric circuit, a power relay having two cooperating windings, means for energizing one of said windings in accordance with the current of the circuit including a current transformer having a relatively high reluctance core whereby to obtain a substantially constant phase relation between its primary and secondary currents.

4. In combination, an alternating current electric circuit, a power relay having cooperating current and potential windings arranged to produce an effect dependent on the product of the fluxes established by said windings and energized in accordance with the potential of the circuit and means for energizing the current winding from the circuit including a current transformer having a magnetic circuit provided with an air gap.

5. In combination, an alternating current electric circuit subject to a reactive current over a range from substantially zero to a relatively large value under different circuit conditions, means responsive to the direction of power from said circuit for controlling the circuit including a relay having two cooperating windings, means for energizing one of said windings in accordance with the circuit current including a current transformer having substantially uniform permeability for all values of current within the range of the reactive current to which the circuit may be subjected whereby to obtain a substantially constant phase relation between the primary and secondary currents of the current transformer.

6. In combination, an alternating current electric circuit subject to a charging current over a range from substantially zero to a relatively large value under different circuit conditions and means for controlling said circuit in accordance with the direction of power in the circuit including a circuit breaker, a power directional relay having cooperating current and potential windings, means for energizing the current winding including a current transformer having substantially uniform permeability for all values of current within said charging current range whereby to obtain a substantially constant phase relation between the primary and secondary currents of the current transformer.

In witness whereof, I have hereunto set my hand this 23d day of December, 1929.

LUKE F. KENNEDY.